(12) United States Patent
Oberheim

(10) Patent No.: US 9,375,795 B2
(45) Date of Patent: Jun. 28, 2016

(54) RECIPROCATING TOOL WITH BIASING SNUBBER

(71) Applicants: Robert Bosch Tool Corporation, Chicago, IL (US); Robert Bosch GmbH, Stuttgart (DE)

(72) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 13/803,111

(22) Filed: Mar. 14, 2013

(65) Prior Publication Data

US 2014/0259701 A1    Sep. 18, 2014

(51) Int. Cl.
*B23D 49/16* (2006.01)

(52) U.S. Cl.
CPC .................. *B23D 49/165* (2013.01)

(58) Field of Classification Search
CPC ..................................... B23D 49/165
USPC ........... 30/392–394; 173/47, 94, 96, 100, 114
See application file for complete search history.

(56) References Cited

U.S. PATENT DOCUMENTS

| | | | | |
|---|---|---|---|---|
| 2,090,656 A * | 8/1937 | Williams | | 89/156 |
| 5,025,562 A | 6/1991 | Palm | | |
| 5,555,626 A | 9/1996 | Fuchs | | |
| 6,249,979 B1 * | 6/2001 | Bednar et al. | | 30/392 |
| 6,634,107 B2 | 10/2003 | Osada | | |
| 6,851,193 B2 | 2/2005 | Bednar et al. | | |
| 6,877,235 B2 | 4/2005 | Osada | | |
| 7,188,425 B2 | 3/2007 | Bednar et al. | | |
| 7,707,729 B2 | 5/2010 | Moreno | | |
| 8,047,119 B2 * | 11/2011 | Hochstrate et al. | | 89/142 |
| 2001/0011420 A1 | 8/2001 | Osada | | |
| 2005/0263946 A1 * | 12/2005 | Zawilinski et al. | | 267/140.12 |
| 2006/0096104 A1 | 5/2006 | Neitzell et al. | | |
| 2008/0184569 A1 * | 8/2008 | Moreno | | 30/392 |
| 2012/0192440 A1 | 8/2012 | Jerabek et al. | | |

FOREIGN PATENT DOCUMENTS

JP      2010084912 A     4/2010

OTHER PUBLICATIONS

International Search Report and Written Opinion corresponding to PCT Application No. PCT/US2014/022584, mailed Jun. 24, 2014 (11 pages).

* cited by examiner

*Primary Examiner* — Sean Michalski
*Assistant Examiner* — Liang Dong
(74) *Attorney, Agent, or Firm* — Maginot Moore & Beck LLP

(57) ABSTRACT

In one embodiment, a reciprocating tool includes a reciprocating plunger, a motor operably connected to the plunger, a cam portion operably connected to the motor, a cam follower operably connected to the reciprocating plunger, and a biasing assembly configured to bias the cam follower toward the cam portion, the biasing assembly including an outer biasing member and an inner biasing member, the inner biasing member in contact with an inner portion of the outer biasing member.

8 Claims, 7 Drawing Sheets

RECIPROCATING TOOL WITH BIASING SNUBBER

FIELD

This invention relates to power hand tools and more specifically to reciprocating power hand tools.

BACKGROUND

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner. Various approaches have been developed which translate the rotation motion into reciprocating motion. A common approach is the incorporation of a wobble plate drive.

A "wobble plate" assembly is a configuration wherein a shaft has an angled portion on which an arm is mounted through a ball bearing assembly. The arm is slidingly positioned within a portion of a plunger assembly. As the angled portion of the shaft rotates, the arm translates the rotation of the shaft into a reciprocating movement of the plunger assembly. One example of a reciprocating tool which incorporates a wobble plate drive is U.S. Pat. No. 7,707,729, which issued on May 4, 2010, the entire contents of which are herein incorporated by reference.

In addition to a reciprocating movement, some reciprocating tools include an orbital movement. This is accomplished by allowing the plunger of the tool to be pivoted, and driving a pivoting movement of the plunger with the motor of the tool. Such orbital movement increases the sawing efficiency of the tool.

In some reciprocating systems, however, the mechanism which is used to effect orbital movement does not force orbital movement throughout a complete reciprocation of the tool. Such partial orbital movement reduces the potential efficiency of the tool. The partial orbital movement in some instances is caused by a phenomenon known as "cam floating".

In systems exhibiting cam float, a cam is used to pivot the plunger. In order to transfer force from the cam to the plunger, a spring is used to bias a cam follower against the cam. At high speeds, however, internal oscillations can be developed within the spring which reduces the effective force applied by the spring. The reduced effectiveness of the spring results in a loss of contact between the cam and the cam follower which can be referred to as "cam floating". To overcome can floating, a spring with a higher spring constant can be incorporated into the device. The increased frictional forces between the cam and the cam follower which are generated by a spring with a higher spring constant increase the wear of the system. Additionally, more power is required to overcome the increased friction. In systems incorporating a battery, the need for increased power significantly reduces the power available for cutting operations as well as the useful charge.

A need exists for a reciprocating tool which provides orbital movement throughout an entire reciprocating cycle of the tool. A further need exists for a reciprocating tool which provides orbital movement without unduly increasing the power required to operate the tool.

SUMMARY

In one embodiment, a reciprocating tool includes a reciprocating plunger, a motor operably connected to the plunger, a cam portion operably connected to the motor, a cam follower operably connected to the reciprocating plunger, and a biasing assembly configured to bias the cam follower toward the cam portion, the biasing assembly including an outer biasing member and an inner biasing member, the inner biasing member in contact with an inner portion of the outer biasing member.

BRIEF DESCRIPTION OF THE DRAWINGS

FIG. 5 depicts a cross-sectional view of the lever arm of FIG. 3 showing the depth of the notch;

DESCRIPTION

Figure 1:
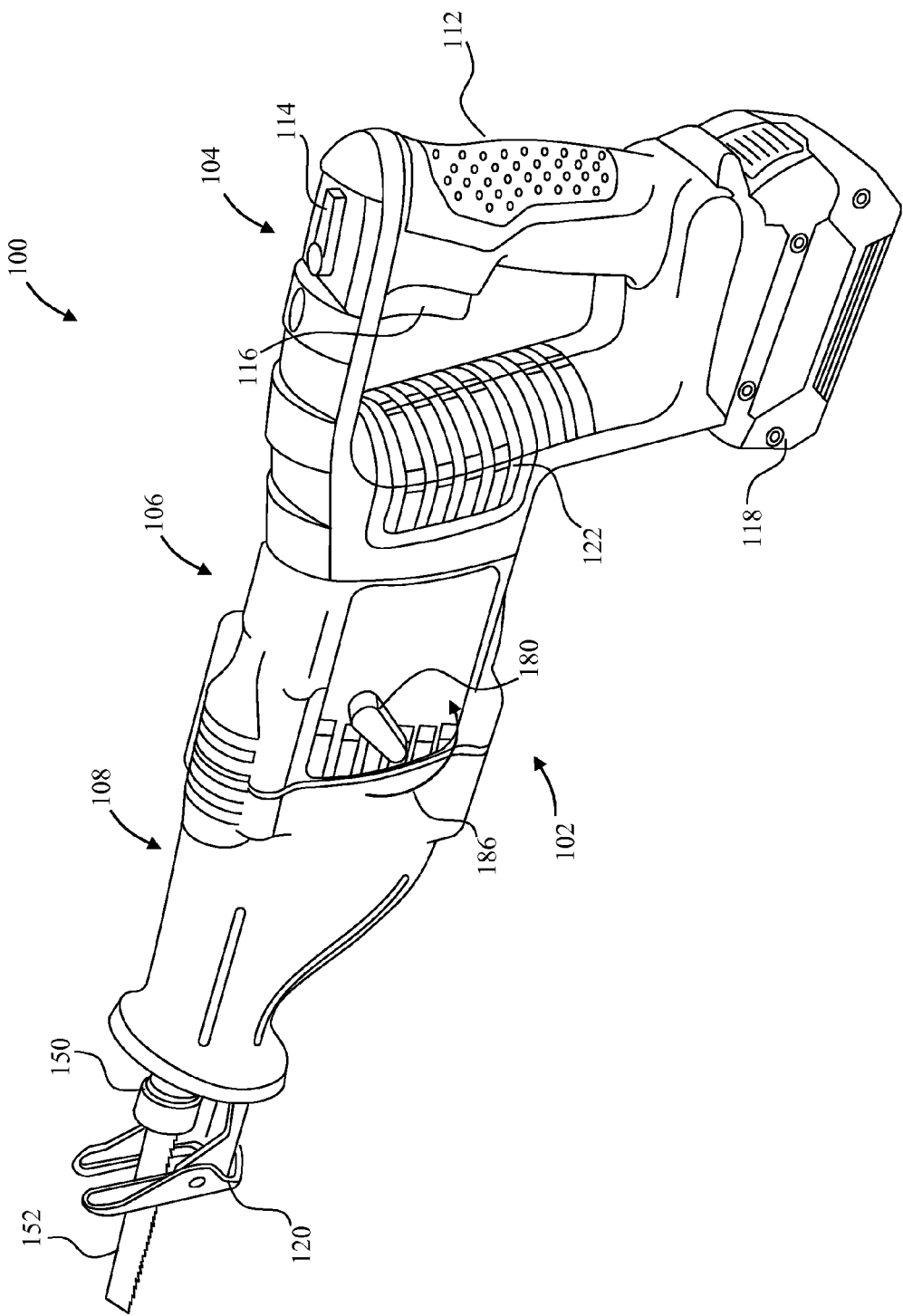
FIG. 1 depicts a side perspective view of a reciprocating tool incorporating an anti-cam float biasing assembly in accordance with principles of the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

FIG. 1 depicts a reciprocating saw 100 including an outer housing 102 which includes a handle portion 104, a motor portion 106, and a nose portion 108. The handle portion 104 includes a grip 112. A dual-speed switch 114 and a variable speed trigger 116 extend from the handle portion housing 104. The handle portion 104 is configured to removably receive a battery pack 118 which in some embodiments is replaced by a corded power supply.

The nose portion 108 is shaped to allow a user to grip the tool 100 while the tool 100 is in use and in some embodiments is made from a rubber material. A nose assembly 120 is located forwardly of the nose portion 108.

Figure 2:
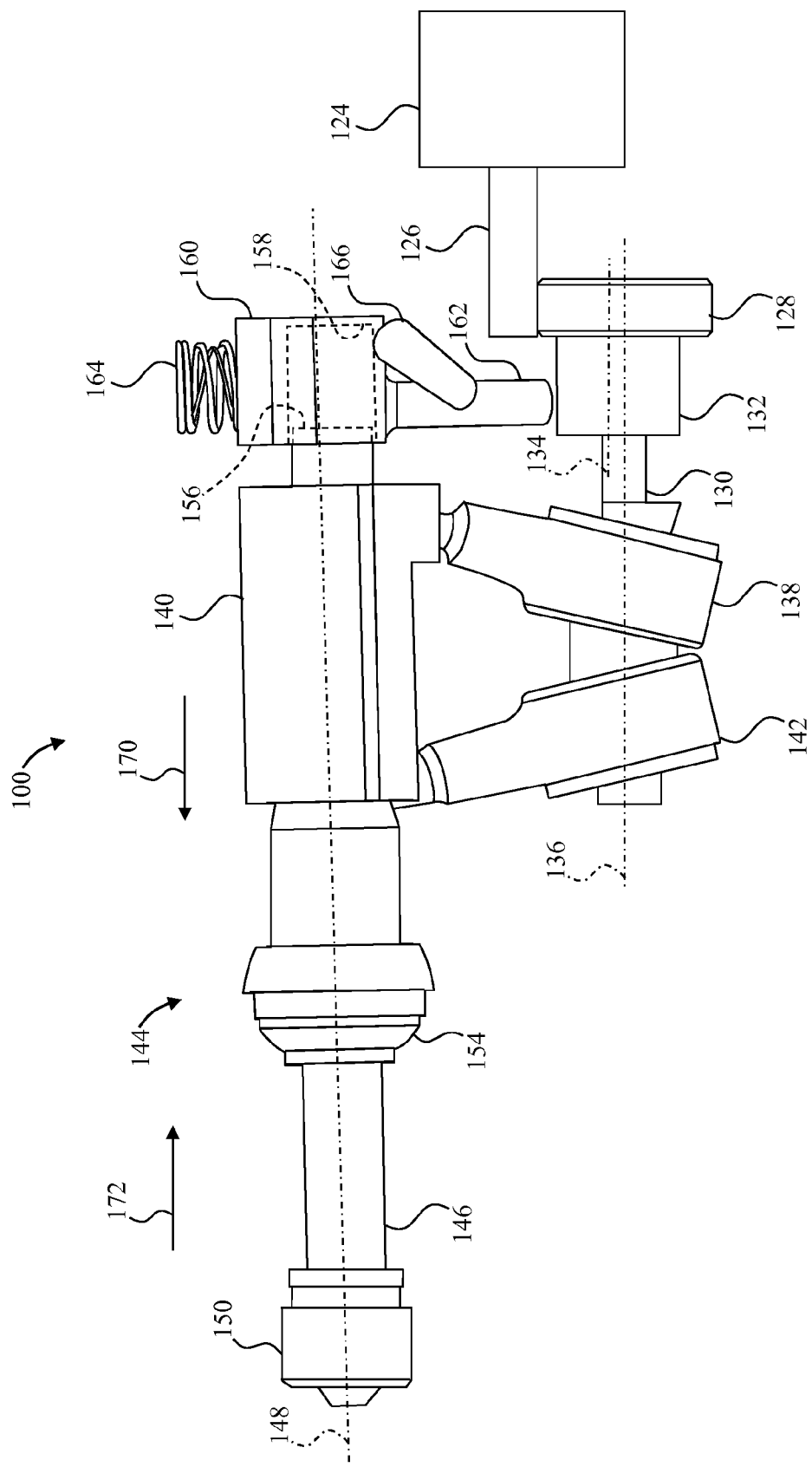
FIG. 2 depicts a side perspective view of the tool of FIG. 1 with the housing removed and a cam follower restrained against contacting a cam portion of a drive shaft.

The motor portion 106 includes a number of ventilation ports 122 which are used to provide cooling air to a motor 124 shown in FIG. 2. The motor 124 rotatably drives an output shaft 126 which is engaged with a gear 128. The gear 128 is fixedly connected to a drive shaft 130 which includes a cam portion 132. The cam portion 132 has a centerline 134 which is offset from an axis of rotation 136 of the drive shaft 130.

A wobble plate assembly 138 is rotatably positioned on the drive shaft 130 and configured to drive a counterweight 140 in a reciprocating motion. Another wobble plate assembly 142 is rotatably positioned on the drive shaft 130 and configured to drive a plunger assembly 144 in a reciprocating motion.

A plunger 146 of the plunger assembly is configured to reciprocate along a plunger axis 148. A chuck assembly 150 is located at a forward portion of the plunger 146. The chuck assembly 150 releasably holds a saw blade 152 (see FIG. 1). The plunger 146 extends from the chuck assembly 150 through a front pivot bushing 154 and the counterweight 140. A rear portion 156 of the plunger 146 is slidingly received within a chamber 158 of a carriage block 160.

A cam follower 162 extends downwardly from the carriage block 160 toward the cam 132. A biasing assembly 164 is located above the carriage block 160 and configured to bias the carriage block 160 toward the cam portion 132. In some embodiments, the upper end of the biasing assembly 164 is positioned in contact with the motor hosing 106. A lever arm 166 releasably supports the carriage block 160 such that in the configuration of FIG. 2 the cam follower 162 does not contact the cam portion 132 at any point in the rotation of the drive shaft 130.

Accordingly, when the lever arm 166 is in the position of FIG. 2, a user applies power to the motor 124 from the battery pack 118 by selecting a speed range with the dual-speed switch 114 and depressing the variable speed trigger 116. As power is applied to the motor 124, the output shaft 126 rotates.

Rotation of the shaft 126 forces the gear 128 to rotate and, since the gear 128 is fixedly connected to the drive shaft 130, the drive shaft 130 rotates as well. The wobble plate assembly 138 is constrained against movement orthogonal to the plunger axis 148 by the configuration of the counterweight 140. Accordingly, as the drive shaft 130 rotates the top of the wobble plate assembly 138 pivots forwardly, in the direction of the arrow 170 of FIG. 2. Movement of the top of the wobble plate assembly 138 in the direction of the arrow 170 forces the counterweight 140 to move in the direction of the arrow 170.

As the counterweight 140 moves forwardly, the drive shaft 130 also forces the wobble plate assembly 142 to move. The wobble plate assembly 142 is constrained against movement orthogonal to the plunger axis 148 by the configuration of the plunger assembly 144. Accordingly, as the drive shaft 130 rotates, the top of the wobble plate assembly 142 pivots rearwardly, in the direction of the arrow 172 of FIG. 2. Movement of the top of the wobble plate assembly 142 in the direction of the arrow 172 forces the plunger 146 to move in the direction of the arrow 172. Accordingly, the rear portion 156 of the plunger 146 moves rearwardly and further into the chamber 158.

As the motor 124 continues to rotate, the above described movement of the wobble plate assembly 138 and the wobble plate assembly 142 is reversed, causing the movement of the counterweight 140 and the plunger 146 to be reversed. The plunger 146 thus reciprocates along the plunger axis 148 out of phase with the reciprocation of the counterweight 140 along the plunger axis 148.

Figure 3:
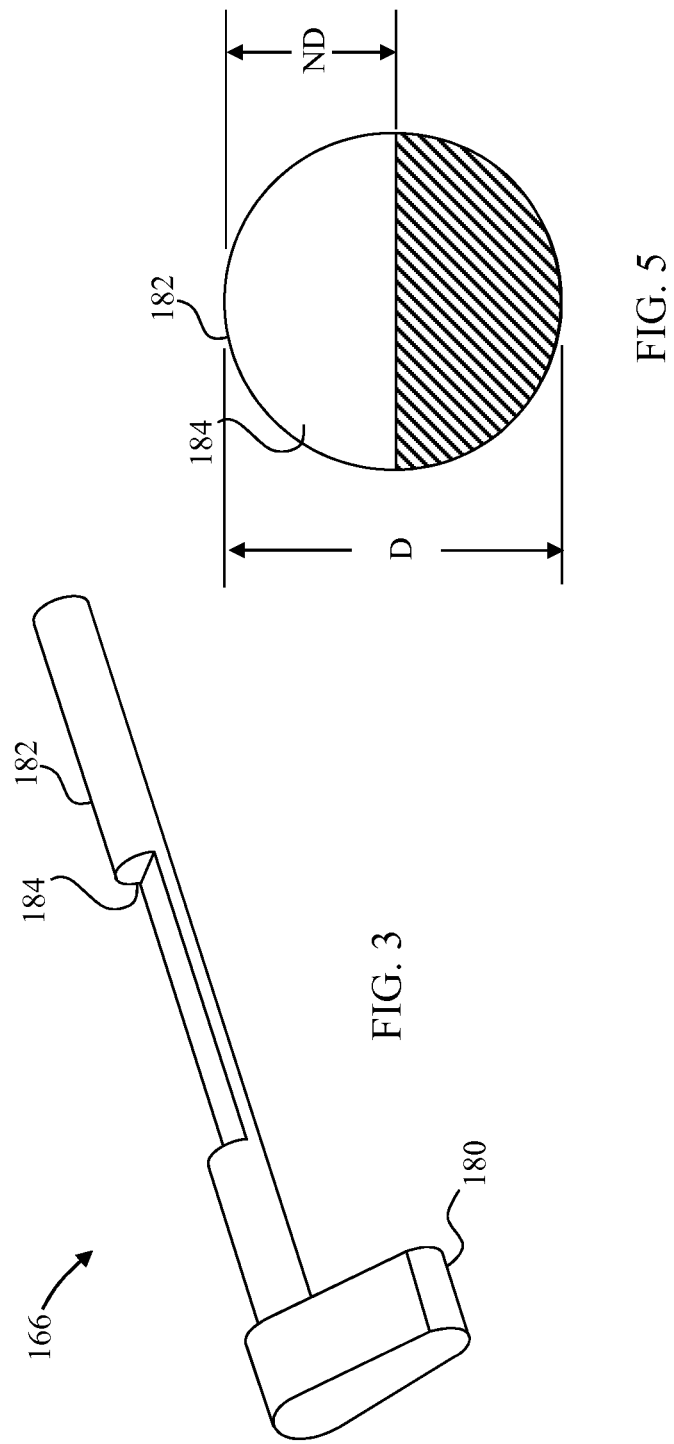
FIG. 3 depicts a perspective view of the lever arm of FIG. 2.
Figure 4:
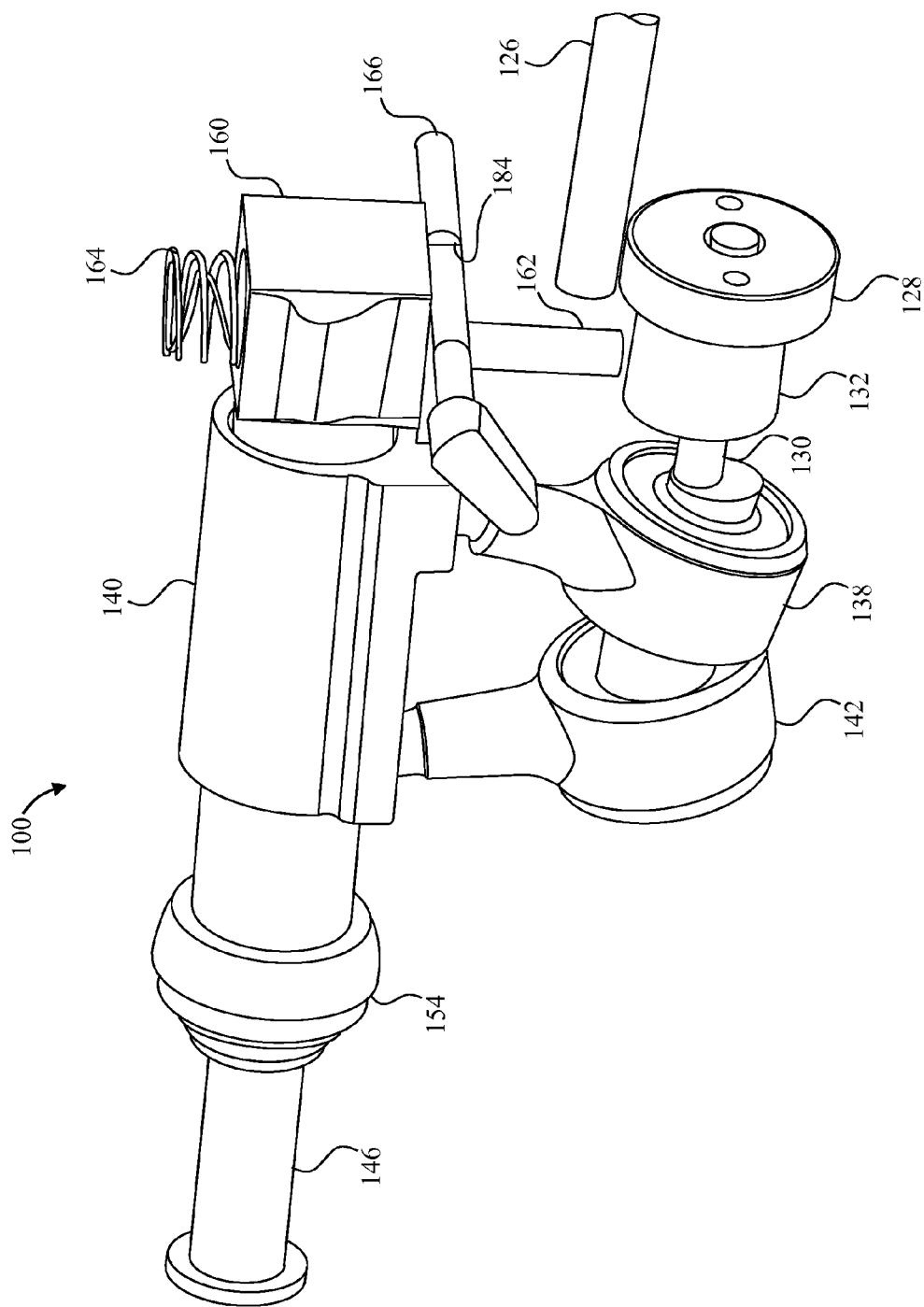
FIG. 4 depicts a side perspective view of the reciprocating tool of FIG. 2 showing a notch of the lever arm aligned with the carriage block and rotated such that the carriage block cannot enter into the notch.

The above described operation of the tool 100 can be modified by rotation of the lever arm 166. As shown in FIG. 3, the lever arm 166 includes a handle 180 which is located outside of the motor portion housing 106 (see FIG. 1) and a shaft 182. The shaft 182 includes a notch 184 which is aligned with the carriage block 160 as shown in FIG. 4. As shown in FIG. 5, the shaft 182 has a diameter "D". The notch has a notch depth "ND" which is at least twice as great as the offset between the axis of rotation 136 and the centerline 134 of the cam portion 132 (see FIG. 2).

Figure 6:
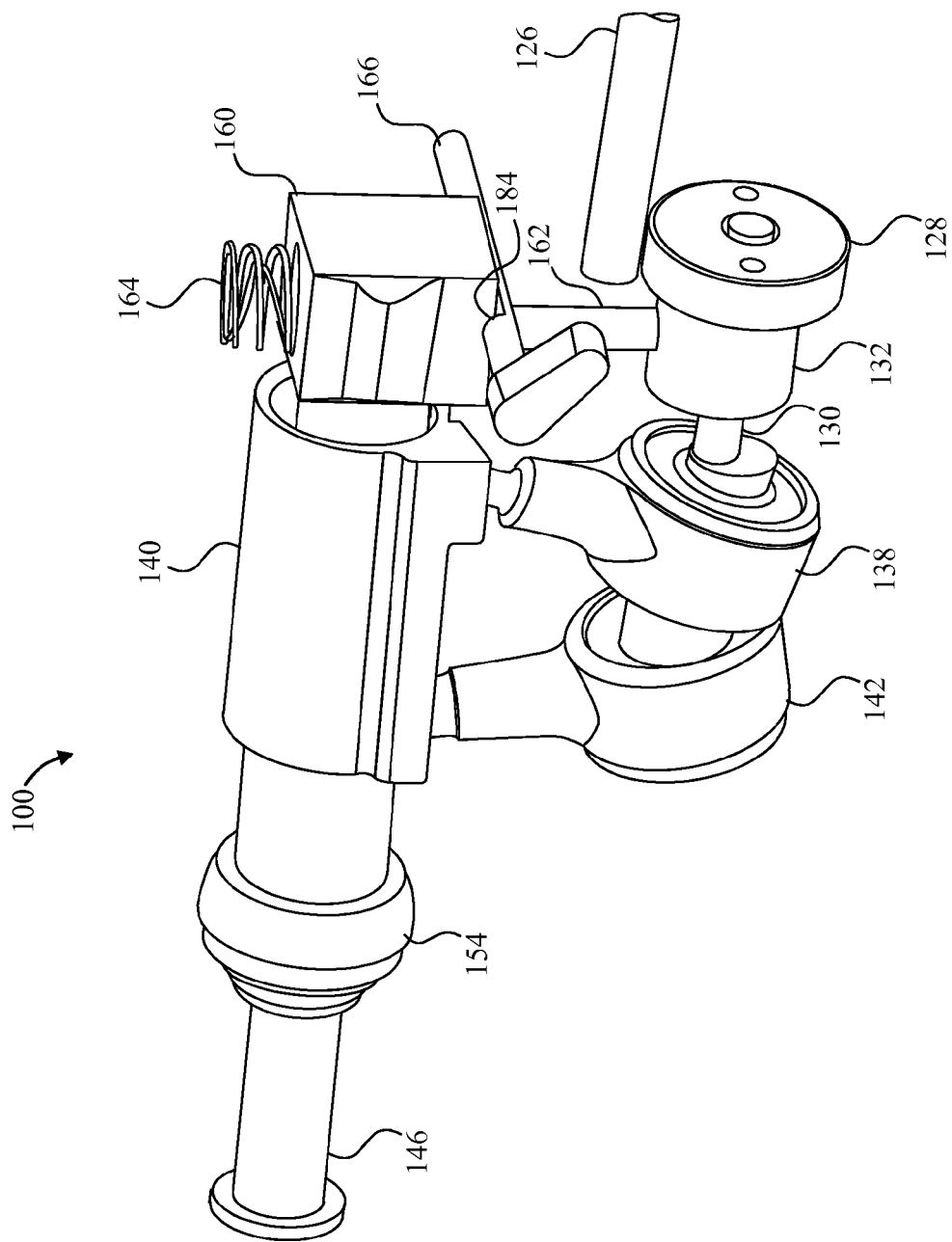
FIG. 6 depicts a side perspective view of the reciprocating tool of FIG. 2 showing the notch of the lever arm aligned with the carriage block and rotated such that the carriage block is forced by the biasing assembly into the notch.

Accordingly, when the handle 180 is rotated in the direction of the arrow 186 in FIG. 1, the notch 184 is rotated to be directly beneath the carriage block 160 and the carriage block 160 is biased by the biasing assembly 164 into the notch 184 until movement of the carriage block 160 is stopped by contact between the cam follower 162 and the cam portion 132 as depicted in FIG. 6. Because the ND is at least twice as great as the offset between the axis of rotation 136 and the centerline 134 of the cam portion 132, the cam follower 162 is able to contact the cam portion 132 throughout the entire rotation of the drive shaft 130.

As the tool 100 is operated with the lever arm 166 in the configuration of FIG. 5, the counterweight 140 and plunger 146 are driven in a reciprocating manner by the wobble plate assemblies 138/142 generally as described above. The cam follower 162 however, is forced against the cam portion 132 by the biasing assembly 164 as the cam portion 132 is rotated by the drive shaft 130. Accordingly, the rear portion 156 of the plunger 146 is forced by the carriage block 160 to move upwardly and downwardly as the centerline 134 rotates about the axis of rotation 136 causing the plunger 146 to pivot about the front pivot bushing 154.

Figure 7:
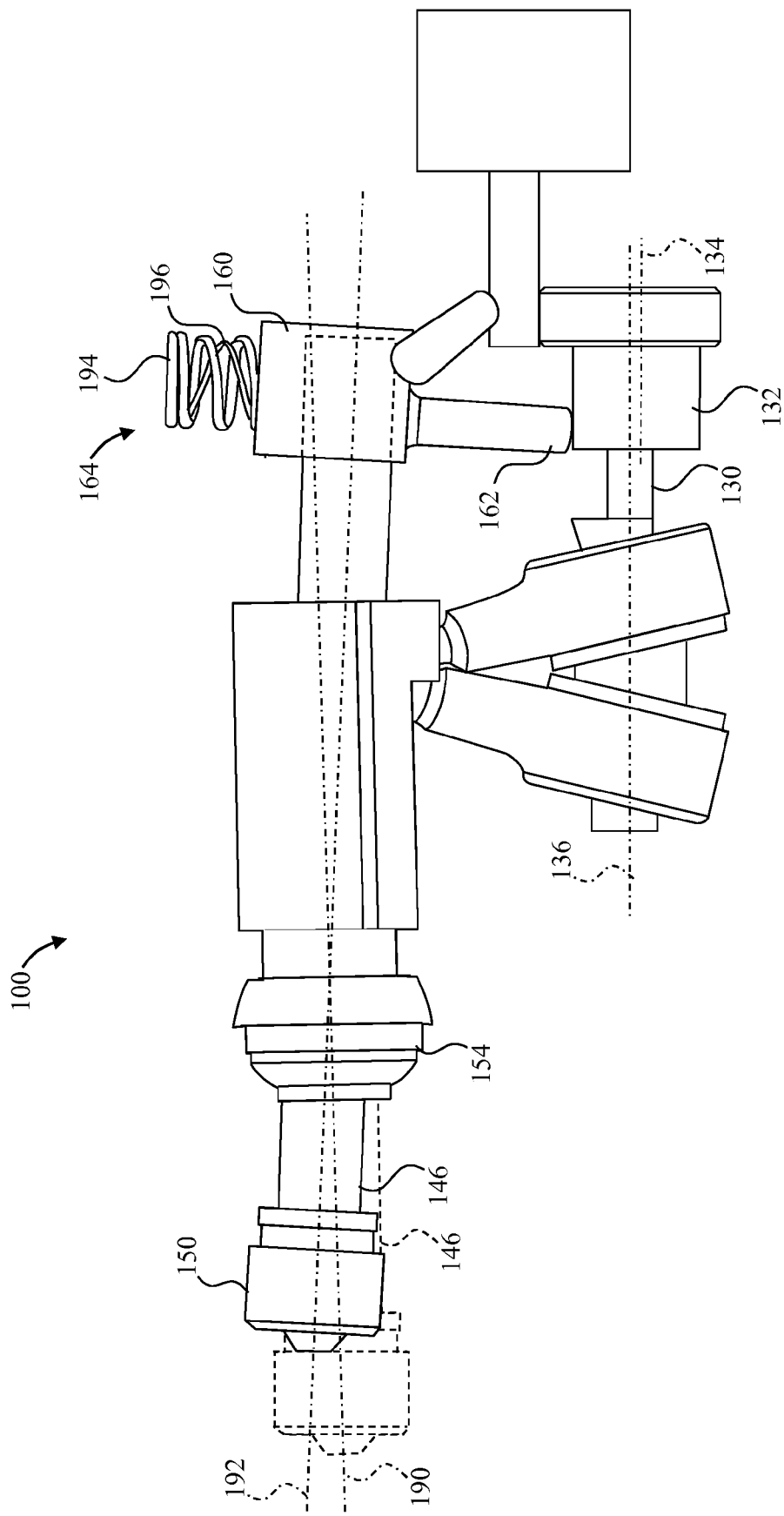
FIG. 7 depicts a side perspective view of the tool of FIG. 1 with the housing removed and the cam follower contacting a cam portion of a drive shaft.

By way of example, FIG. 7 depicts the forward portion of the plunger 146 in shadow at a moment when the centerline 134 of the cam portion 132 is directly above the axis of rotation 136 of the drive shaft 130. Accordingly, the carriage block 160, and hence the rear portion 156 of the plunger 146, is at the highest point achievable using just the cam portion 132 (the lever arm 166 moves the carriage 160 slightly higher to fully disengage the cam follower 162 from the cam portion 132). At the highest point of the carriage 160 forced by the cam portion 132, the plunger moves along an axis 190.

FIG. 7 also depicts the tool 100 (not in shadow) when the centerline 134 of the cam portion 132 is directly below the axis of rotation of the drive shaft 130. Accordingly, the carriage block 160, and hence the rear portion 156 of the plunger 146, is at the lowest point realized by the carriage 160. At the low point of the carriage 160, the plunger moves along an axis 192. The chuck assembly 150 is thus pivoted to an upward location as the plunger 146 begins to move forwardly and as the plunger 146 begins to move rearwardly, the chuck assembly 150 is pivoted downwardly. By pivoting the chuck assembly 150 downwardly as the plunger 146 is moving rearwardly, the blade 152 is forced into a work piece, enhancing the cutting motion of the tool 100.

Optimal performance of the tool 100 with the lever arm 166 in the position of FIG. 6 is dependent upon proper tracking of the cam portion 132 with the cam follower 162. Such tracking becomes more difficult as the drive shaft speed of rotation increased. In some prior art devices, cam followers lose contact with the cam portions at high speeds because internal oscillations of the spring are induced. Such internal oscillations result in a condition known as "cam floating" wherein the cam follower fails to contact the cam during the entire rotation of the cam. This results in reduced cutting efficiency. Cam floating is avoided in the tool 100 because of the biasing assembly 164.

Figure 8:
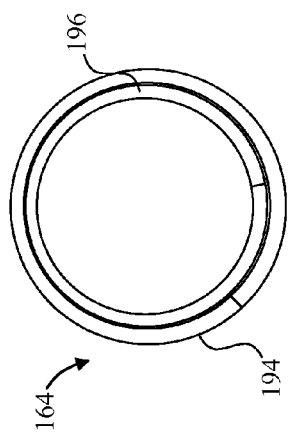
FIG. 8 depicts a top plan view of the biasing assembly of FIG. 2 showing an inner biasing member contacting an inner portion of an outer biasing member.

The biasing assembly 164 in one embodiment includes an outer biasing member 194 in the form of a spring and an inner biasing member 196 also in the form of a spring. The outer biasing member 194 provides sufficient force to maintain the cam follower 162 in contact with the cam portion 132 during the entire rotation of the cam portion 132. The spring constant of the outer biasing member 194 is much larger than the spring constant of the inner biasing member 196. The inner biasing member 196 thus contributes very little to the overall force of the biasing assembly 164. The inner biasing member 196, however, rubs against the outer biasing member 194. As shown more clearly in FIG. 8, the outer portion of the inner biasing member 196 rubs against the inner portion of the outer biasing member 194.

Accordingly, as the speed of rotation of the drive shaft 130 increases, the inner biasing member 196 dampens the outer biasing member 194, thereby eliminating any internal oscillations in the outer biasing member 194 and precluding cam floating. Consequently, the biasing assembly 164 provides proper tracking of the cam portion 132 with the cam follower 162 while minimizing the frictional losses at the cam portion 132 cam follower 162 interface.

In other embodiments, one or more of the outer biasing member 194 and the inner biasing member 196 is replaced with a biasing member that is not in the form of a spring. Biasing members which are used in various embodiments, in various combinations, include coils, steel sponges, rubberized elements, friction dampers, viscous dampers, and the like. Accordingly, in one embodiment the biasing assembly includes an outer spring and an inner coil, in another embodiment the biasing assembly includes an outer coil and an inner coil, etc. In all of these embodiments, a means is provided to dampen internal oscillations.

Figure 9:
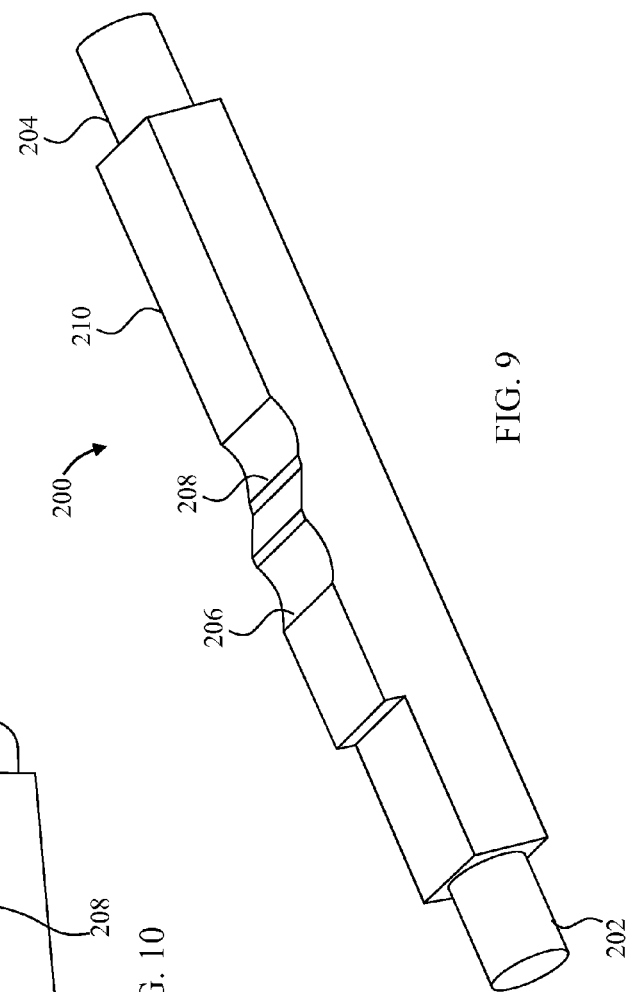
FIG. 9 depicts a side perspective view of a slide control which in some embodiments replaces the lever arm of FIG. 3, showing two detents of different heights.

In some embodiments, the lever arm 166 is replaced by a slide control 200 as depicted in FIG. 9. The slide control 200 includes two tabs 202/204 which extend outwardly of a motor housing such as motor housing 106. The slide control 200 further includes a first detent area 206 and a second detent area 208 defined in a body portion 210. The first detent area 206 is relatively shallow while the second detent area 208 is deep.

When the slide control 200 is incorporated into the tool 100 as depicted in FIG. 9, the carriage block 160 is modified to include a pin 212. The pin 212 in some embodiments is rotatably supported by the carriage block 160. The first detent area 206 and the second detent area 208 have a radius of curvature complementary to the radius of curvature of the pin 212. Accordingly, when the pin 212 is aligned with the first detent area 206, the biasing assembly 164 forces the pin 212 against the first detent area 206 such that the slide control 200 is maintained in position with the tab 204 extending outwardly of the motor housing portion 106. Because the first detent area 206 is relatively shallow, the cam follower 162 does not contact the cam portion 132 and there is no orbital movement of the plunger 146.

Figure 10:
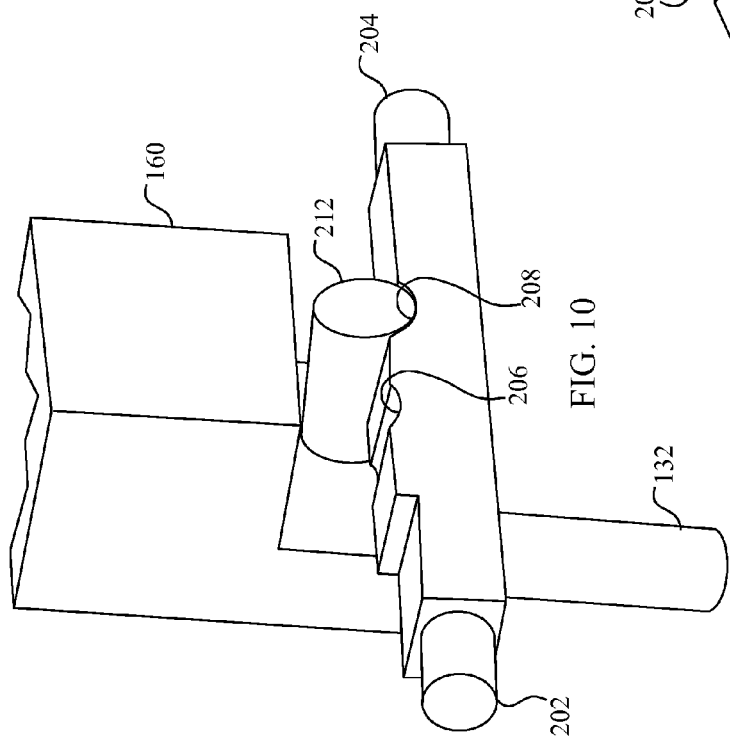
FIG. 10 depicts a perspective view of the slide control of FIG. 9 incorporated into the tool of FIG. 1, with a rotatable pin supported by the carriage block.

When orbital movement is desired, a user presses the tab 204, which may be color coded, forcing the slide control 200 to move such that the second detent area 208 is aligned with the pin 212 (as depicted in FIG. 10) while the tab 202 extends outwardly of the motor housing 106. The second detent area 208 is deeper than the first detent area 206 by an amount of at least two times the distance between the axis of rotation 136 and the centerline 134 of the cam portion 132. Accordingly, the cam follower 162 is forced into contact with the cam portion 132 in substantially the same manner as described above with respect to the embodiment of FIG. 2.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A reciprocating tool comprising:
a reciprocating plunger;
a motor operably connected to the plunger;
a cam portion operably connected to the motor;
a cam follower operably connected to the reciprocating plunger; and
a biasing assembly configured to bias the cam follower toward the cam portion, the biasing assembly including an outer biasing member and an inner biasing member, the inner biasing member in contact with an inner portion of the outer biasing member;
wherein the outer biasing member has a first spring constant;
the inner biasing member has a second spring constant; and
the first spring constant is larger than the second spring constant;
a slide control linearly movable along a first axis between a first position whereat the cam follower is constrained against contacting the cam portion and a second position whereat the cam follower is not constrained against contacting the cam portion;
a carriage block operably engaged with the plunger and the biasing assembly, wherein the cam follower extends from the carriage block toward the cam portion;
a pin extends from the carriage block along a second axis;
the first axis is orthogonal to the second axis; and
the slide control is configured to contact the pin when the slide control is in the first position;
wherein the pin is rotatable with respect to the carriage block.

2. The reciprocating tool of claim 1, further comprising:
a drive shaft operably connected to the motor, wherein the cam portion is a portion of the drive shaft.

3. The reciprocating tool of claim 2, further comprising:
a first wobble plate assembly operably connected to the drive shaft and to the plunger.

4. The reciprocating tool of claim 3, further comprising;
a reciprocating counterweight; and
a second wobble plate assembly operably connected to the drive shaft and to the counterweight.

5. The reciprocating tool of claim 1, wherein the first spring constant is selected such that the cam follower is forced into contact with the cam portion for an entire rotation of the cam portion when the slide control is in the second position.

6. The reciprocating tool of claim 1, wherein:
the slide control includes a first detent area aligned with the pin when the slide control is in the first position; and
the slide control includes a second detent area aligned with the pin when the slide control is in the second position.

7. The reciprocating tool of claim 1, wherein:
the cam portion has a centerline;
the cam portion rotates about an axis of rotation;
the centerline is spaced apart from the axis of rotation by a first distance.

8. The reciprocating tool of claim 1, wherein the slide control comprises:
a first tab at a first end portion of the slide control and
a second tab at a second end portion of the slide control the first end portion opposite the second end portion.

* * * * *